United States Patent
Yamada

(10) Patent No.: US 8,311,910 B2
(45) Date of Patent: Nov. 13, 2012

(54) IMAGE PROCESSING APPARATUS, METHOD, AND STORAGE MEDIUM

(75) Inventor: Kaori Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 12/430,775

(22) Filed: Apr. 27, 2009

(65) Prior Publication Data

US 2009/0271304 A1    Oct. 29, 2009

(30) Foreign Application Priority Data

Apr. 28, 2008    (JP) .................................. 2008-117295

(51) Int. Cl.
- G07F 19/00 (2006.01)
- G06F 17/00 (2006.01)
- G07B 15/02 (2006.01)
- G07B 17/00 (2006.01)
- G06F 3/12 (2006.01)

(52) U.S. Cl. .............. 705/34; 705/30; 705/418; 358/1.1

(58) Field of Classification Search .................... 705/30, 705/34, 418

See application file for complete search history.

(56) References Cited

U.S. PATENT DOCUMENTS

| | | | | |
|---|---|---|---|---|
| 4,107,777 A * | 8/1978 | Pearson et al. | ................. | 705/413 |
| 7,034,952 B2 * | 4/2006 | Okuda et al. | ................. | 358/1.15 |
| 7,571,126 B2 * | 8/2009 | Nguyen et al. | ................. | 705/30 |
| 7,791,752 B2 * | 9/2010 | Eschbach et al. | ............. | 358/1.15 |
| 8,040,543 B2 * | 10/2011 | Shimizu et al. | ............... | 358/1.15 |
| 2001/0056406 A1 * | 12/2001 | Nagoya et al. | ................... | 705/52 |
| 2003/0046171 A1 * | 3/2003 | Whale | ............................. | 705/26 |
| 2004/0172372 A1 * | 9/2004 | Wells et al. | ..................... | 705/400 |
| 2004/0225578 A1 * | 11/2004 | Hager et al. | ..................... | 705/26 |
| 2008/0275809 A1 * | 11/2008 | Rutt et al. | ........................ | 705/37 |

FOREIGN PATENT DOCUMENTS

| | | |
|---|---|---|
| JP | 07-133148 A | 5/1995 |
| JP | 2000-353148 A | 12/2000 |
| JP | 2001-156957 A | 6/2001 |
| JP | 2003-015487 A | 1/2003 |
| JP | 2005-107639 A | 4/2005 |
| JP | 2006-099300 A | 4/2006 |
| JP | 2006-157122 A | 6/2006 |
| JP | 2007-190805 A | 8/2007 |

\* cited by examiner

*Primary Examiner* — Scott Zare
(74) *Attorney, Agent, or Firm* — Canon USA Inc. IP Division

(57) ABSTRACT

An image processing apparatus that charges a user for executing a predetermined image process holds charging information in a storage device, charges a user for executing the predetermined image process based on charging information held in the storage device. When the charging information held in the storage device is updated, the image processing apparatus determines whether to permit the update of the charging information based on an operated state of the image processing apparatus by the user, and according to the result of determination, the image processing apparatus is controlled so that the charging information is updated if the update of the charging information is permitted, and is controlled so that the charging information is not updated if the update of the charging information is not permitted.

16 Claims, 12 Drawing Sheets

FIG. 6

| FUNCTION | PRINT TYPE | UNIT PRICE | DATE/TIME TO BEGIN UNIT PRICE UPDATE | DATE/TIME TO END UNIT PRICE UPDATE |
|---|---|---|---|---|
| COPY | MONOCHROME (SMALL) | 10 | | |
| COPY | MONOCHROME (LARGE) | 80 | | |
| COPY | COLOR (SMALL) | 10 | 2007/11/1 10:00 | 2007/11/30 23:59 |
| COPY | COLOR (LARGE) | 80 | 2007/11/1 10:00 | 2007/11/30 23:59 |
| COPY | SINGLE COLOR (SMALL) | 10 | 2007/11/1 10:00 | 2007/11/30 23:59 |
| COPY | SINGLE COLOR (LARGE) | 80 | 2007/11/1 10:00 | 2007/11/30 23:59 |

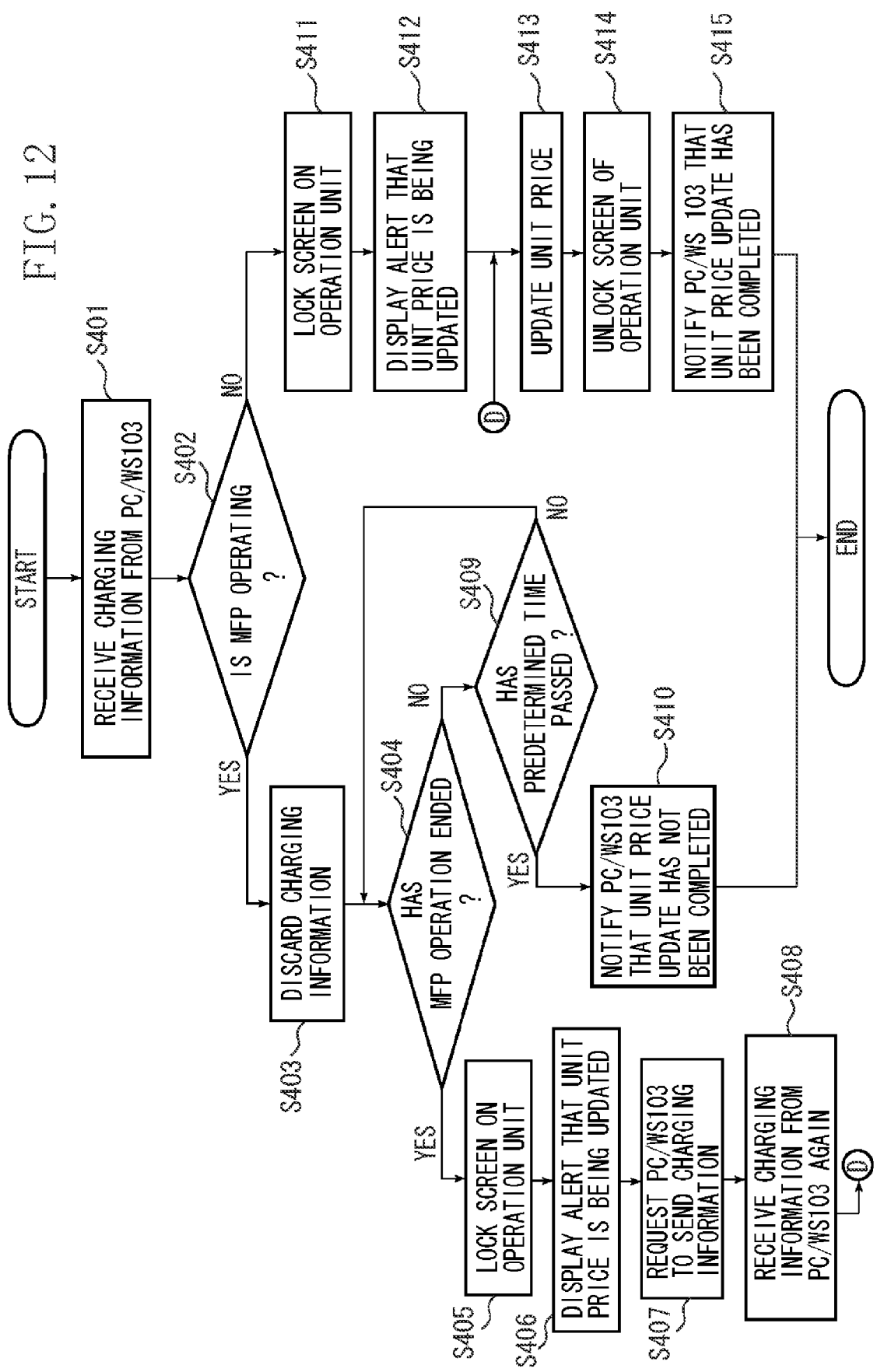

IMAGE PROCESSING APPARATUS, METHOD, AND STORAGE MEDIUM

BACKGROUND OF THE INVENTION

1. Field of the Invention

The present invention relates to an image processing apparatus configured to charge a user for a service of executing a predetermined image process.

2. Description of the Related Art

In convenience stores, supermarkets, and libraries, or the like, multifunction peripherals (MFP), more specifically, image processing apparatuses having various image processing functions such as a copying machine, a facsimile machine, and a photo printer, are installed. The MFP holds charging information for collecting use fees for the apparatus from users, and performs a charging process based on charging information.

In recent years, MFPs have become increasingly popular. MFPs may be connected to a network (LAN), and include functions to transmit image data read by a scanner function of the MFP or to print image data received via the network. The MFP, connected to the network, is capable of transmitting or receiving image data, and setting and updating setting information of the MFP based on information received via the network.

For example, Japanese Patent Application Laid-Open No. 2006-099300 discusses a technique in which setting information for a plurality of devices connected to the network is controlled by a management server, and when the setting information for one of the plurality of devices is changed, the change is sent and reflected in the information in those devices.

The above-mentioned charging information held in each MFP needs to be updated whenever the fee system in the stores is changed and some campaign is performed. However, if charging information is updated while a user is using the MFP, an amount of money, which is different from the charge that the user expected, is charged, and may be a source for disputing the charge.

If charging information is updated via the network by using the known technology, the server side may not know whether a user is operating the MFP. Therefore, the charging information may be updated while the user is operating the MFP.

SUMMARY OF THE INVENTION

The present invention is directed to a method for determining whether to permit update of charging information based on an operating condition by a user, and not executing update when it is determined not to permit the update.

According to an aspect of the present invention, an image processing apparatus that charges a user for executing a predetermined image process is provided. The image processing apparatus includes a holding unit configured to hold charging information, a charging unit configured to charge a fee for a service of executing the predetermined image process based on the charging information held in the holding unit, an update unit configured to update the charging information held in the holding unit, a determination unit configured to, when the charging information held in the holding unit is updated, determine whether to permit the update of the charging information based on an operation state of the image processing apparatus by the user, and a control unit configured to control the update unit to update the charging information if the determination unit determines that update of the charging information is permitted, and to control the update unit not to update the charging information if the determination unit determines that the update of the charging information is not permitted Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 illustrates an example of a charging table according to the first exemplary embodiment of the present invention.

FIG. 12 is a flowchart illustrating an update operation of charging information according to the fourth exemplary embodiment of the present invention.

DETAILED DESCRIPTION OF THE EMBODIMENTS

Exemplary embodiments of the invention will be described in detail below with reference to the drawings.

Figure 1:
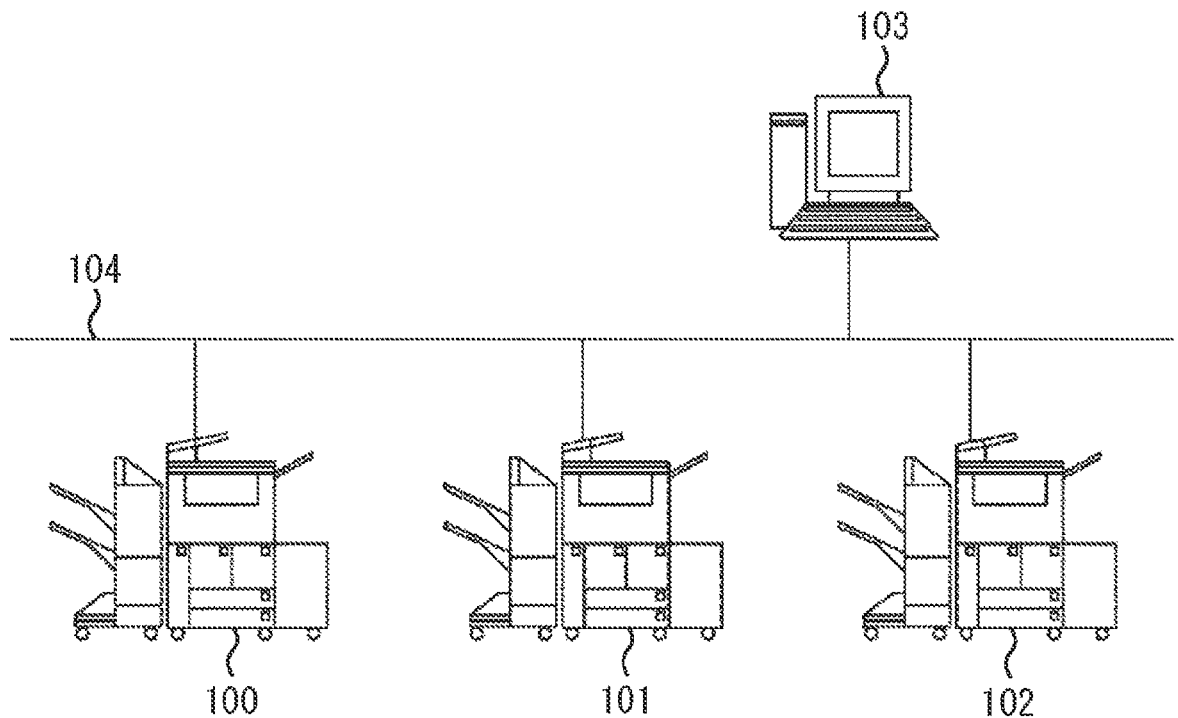
FIG. 1 illustrates an entire network system according to a first exemplary embodiment of the present invention.

FIG. 1 illustrates an entire network system to which an image processing apparatus according to a first exemplary embodiment of the present invention is connected. MFPs 100, 101, and 102 are connected to the network 104. A personal computer or work station (hereafter referred to as a PC/WS) 103 is connected to the network 104.

The MFPs 100, 101, and 102 each have similar functions. Therefore, only an MFP 100 will be explained in the following description. Though three MFPs 100, 101, and 102 and one PC/WS 103 are connected in the exemplary embodiment, the number of MFPs and PC/WS can be changed arbitrarily.

The network here can be implemented by using the Internet, a LAN, or a WAN or a combination of them, as long as the network can transmit and receive data. The PC/WS 103 can be any type of device as long as it can function as a server. The PC/WS 103 can transmit charging information simultaneously to each of the MFPs 100, 101, and 102.

Figure 2:
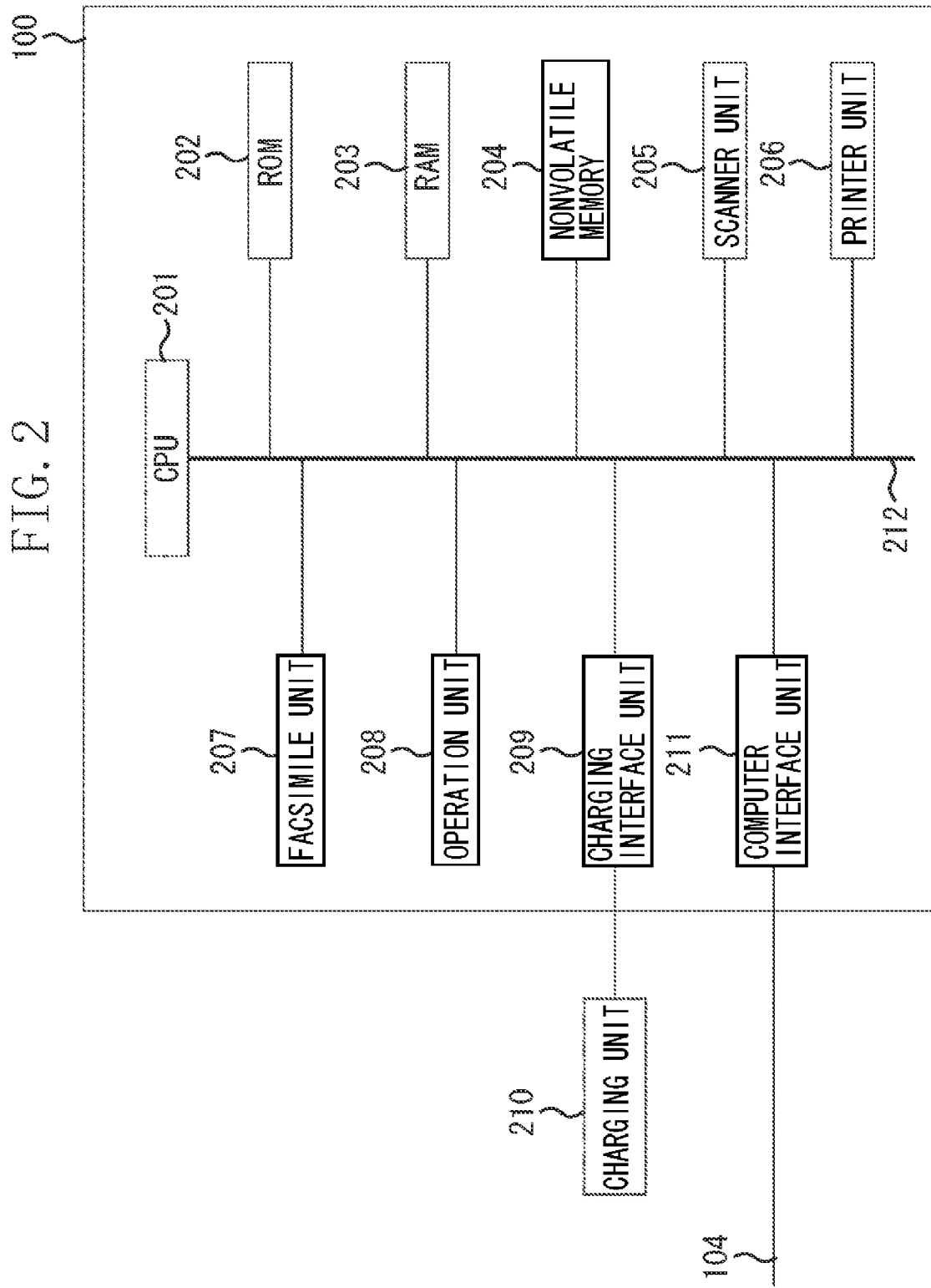
FIG. 2 is a block diagram illustrating an internal configuration of an MFP according to the first embodiment of the present invention.

FIG. 2 is a block diagram illustrating an internal configuration of the MFP 100. A central processing unit (CPU) 201 controls the whole operation of the MFP 100 according to a control program stored in a ROM 202. The ROM 202 stores a program necessary to control various functions to be executed by the MFP 100, and a RAM 203 is used, as a work area of the CPU 201. A nonvolatile memory 204 is, for example, a hard disk, flash memory, EEPRPM or EPROM. The nonvolatile memory 204 accumulates programs and data necessary for displaying a screen of an operation unit and for switching languages.

A scanner unit 205 reads an image of a document placed on a document reading unit (not illustrated) and outputs image data. A printer unit 206 prints image data output from the scanner unit 205 onto a recording medium. A facsimile unit 207 transmits and receives compressed image data via the telephone line. Compressed image data received from the facsimile unit 207 is temporarily stored in the nonvolatile memory 204.

An operation unit 208 includes a key-input section, including a copy mode setting key, a ten-key pad to set a number of copies and a start key to start copying, and an LED or liquid crystal display section to display the settings of operation modes and the like. Details will be described later with reference to FIG. 3.

A charging interface unit 209 is connected to a charging unit 210 via a line and exchanges with the charging unit 210 information, such as the presence of inserted money, and information about whether there is enough remaining money considering the charges for image processing service to be executed by the apparatus. Only the case in which cash is used is described here, but a pre-paid card or the like can be used. The charging unit 210 includes a receiving unit to receive coins from a user.

A computer interface unit 211 is an interface to connect between the MFP 100 and the PC/WS 103 via a network 104. The computer interface unit 211 receives image data and charging information from the PC/WS 103 and stores them in the nonvolatile memory 204. The above-described units in the MFP 100 are interconnected to each other via a bus 212.

Figure 3:
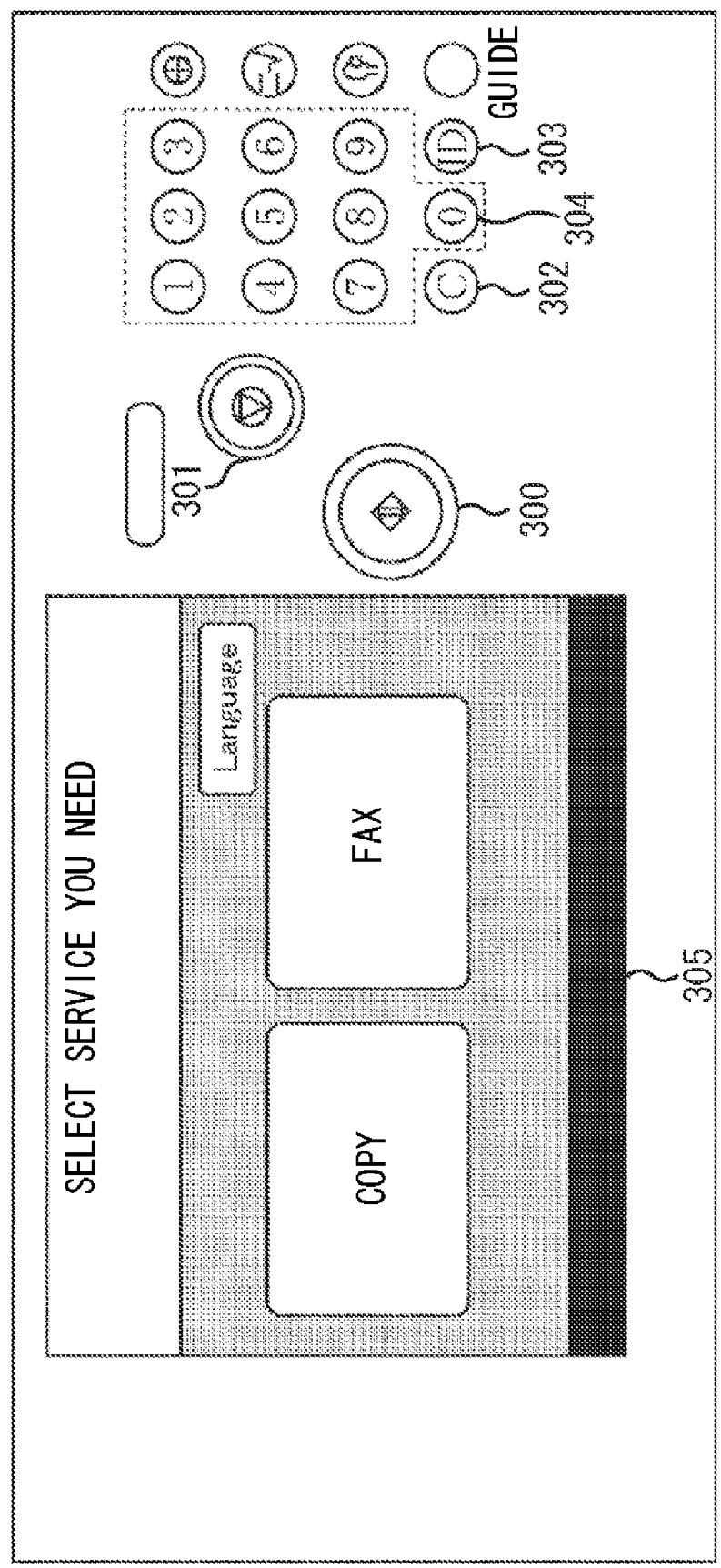
FIG. 3 is an external view of an operation unit in the first exemplary embodiment of the present invention.

FIG. 3 is an external view of the operation unit 208 illustrated in FIG. 2. In FIG. 3, a start key 300 is pressed to start copying or facsimile transmission. A stop key 301 is pressed to stop copying or facsimile transmission. A clear key 302 is pressed to clear numeric values entered.

An ID key 303 is used to allow only specific users to use the MFP 100. Unless an ID is input by using the ID key, the user of the MFP 100 is not allowed to use the MFP 100. A ten-key 304 is used to input numeric values, for example, to set magnification or number of copies.

A liquid crystal display operation portion 305 includes a touch panel display to display the state of the MFP 100 and the settings of the copy mode. By touching items displayed on the display screen, the screen image changes or shifts to enable the user to adjust settings of the copy mode.

Figure 4:
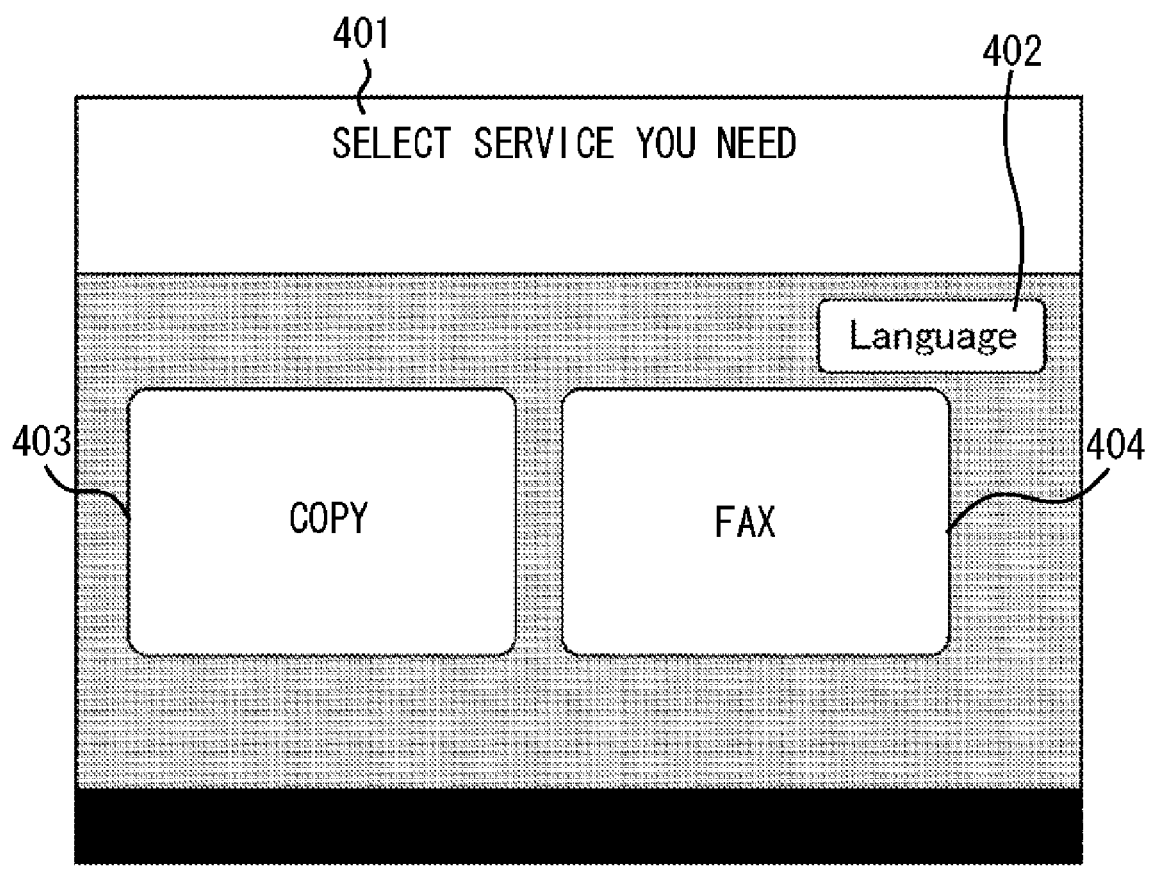
FIG. 4 illustrates an example of an operation screen displayed on the liquid crystal display operation unit according to the first exemplary embodiment of the present invention.

FIG. 4 is an example of the operation screen displayed on the liquid crystal operation portion 305 illustrated in FIG. 3. In the upper portion of the screen, there is a message area 401, which displays what can be done on the currently displayed screen. A Language Switching key 402 is pressed to switch the language to be displayed.

A key 403 is assigned a copy mode, and a fax key 404 is assigned a fax mode. When the key 403 is pressed, a setting screen is displayed for copying by reading an image on a document with the MFP 100. When the key 404 is pressed, a setting image is displayed so that an image on a document is read by the MFP 100 and is transmitted via a telephone line.

Figure 5:
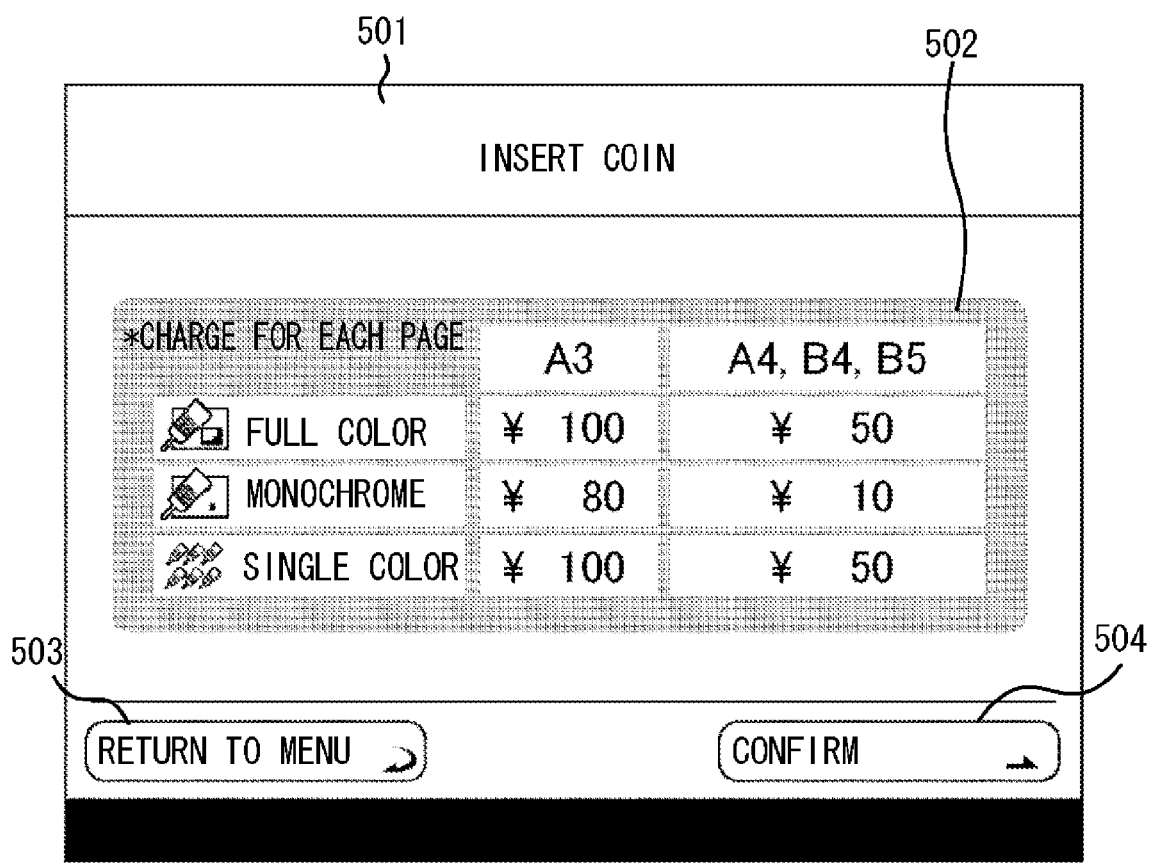
FIG. 5 illustrates an example of the operation screen displayed on the liquid crystal display operation unit according to the first exemplary embodiment of the present invention.

FIG. 5 illustrates an example of an operation screen displayed when the key 403 is pressed. Similar to the message area 401, in the upper portion of the screen, a message area 501 is provided to display what can be done on the currently displayed screen.

A copy charge display image 502 shows unit prices of various image processing services as currently set charging information. A return key 503 is used to return the current screen to the screen illustrated in FIG. 4. A confirm key 504 can be pressed when money is inserted into the charging unit 210. Settings on the next screen cannot be performed unless money is inserted. Before image processing service is actually provided, the user is provided with unit price information, the user can make sure what services are offered for what prices before having a service performed.

The transmission of charging information from an external device, such as the PC/WS 103, via the network 104 and the update of charging information indicating unit prices as charges for each of predetermined units of image processing service will now be described.

FIG. 6 illustrates an example of a charging information table transmitted from the PC/WS 103. In the example in FIG. 6, information is set so unit prices of monochrome copy is not changed, but unit prices of full color and single color copies are changed for specific periods.

The time information including unit prices indicating charge per sheet when printing is performed, date and time to start the change of unit prices, and date and time to end the change of unit prices are provided. Any attributes that are necessary to update unit prices can be registered in the charging information table. The attributes are expressed here in a data type of a table, the attributes need not be expressed in a table form. The attributes can be expressed in any data type such as an array type as long as it can provide necessary information for updating the unit prices.

Figure 7:
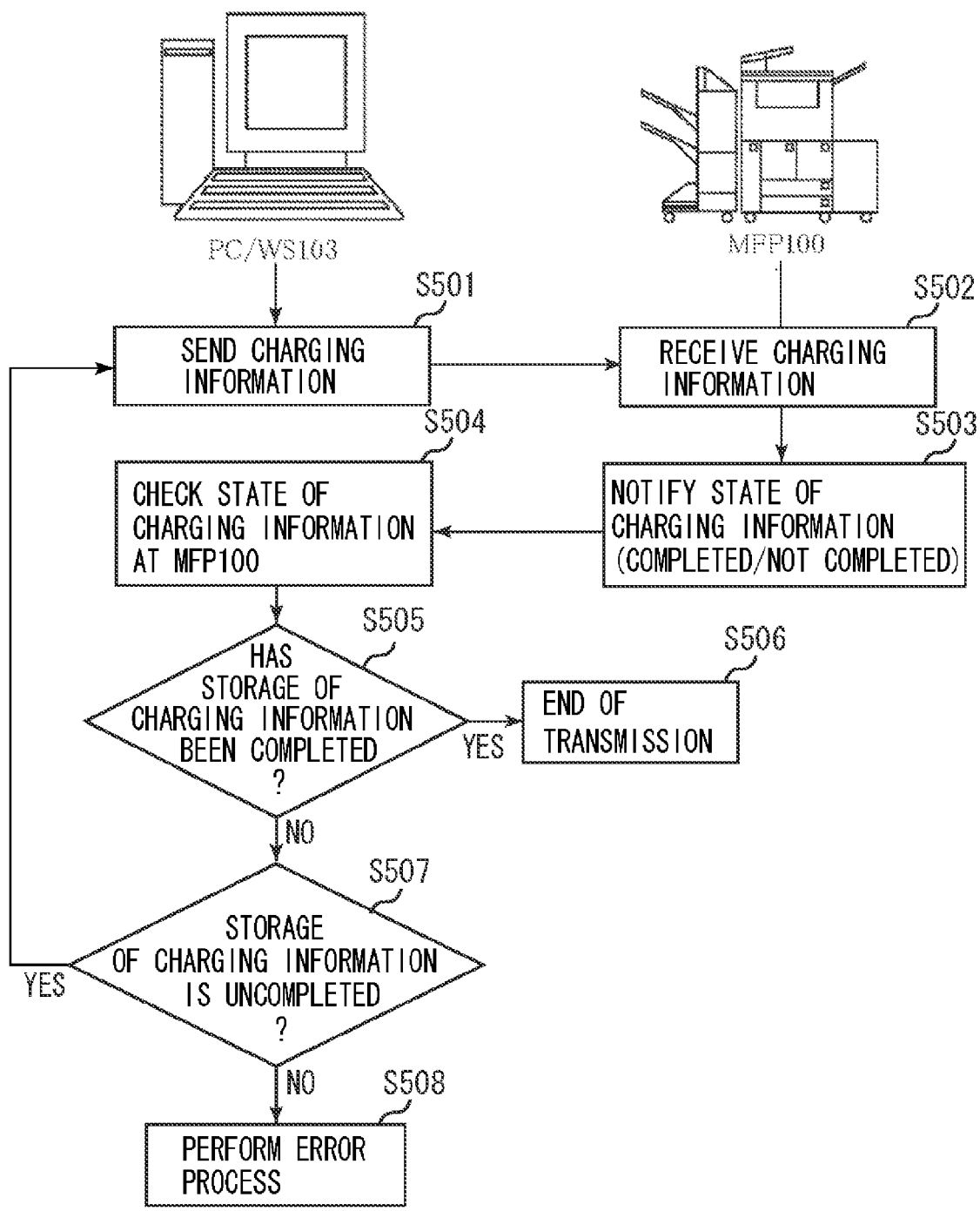
FIG. 7 is a flowchart illustrating exchanging of charging information between the PC/WS and the MFP according to the first exemplary embodiment of the present invention.

FIG. 7 is a flowchart illustrating an example of communication process between the PC/WS 103 and the MFP 100. In step S501, the PC/WS 103 transmits a charging information table as illustrated in FIG. 6 to the MFP 100 via the network 104 before the date and time when update is started.

In step S502, on receiving charging information, the MFP 100 stores the charging information in the nonvolatile memory 204. In step S503, when the reception and storage of charging information are completed, the MFP 100 notifies the PC/WS 103 that the charging information has been stored via the computer interface unit 211 in the MFP 100. If the reception or storage of the charging information has not been completed due to an error in network communication, the MFP 100 notifies the PC/WS 103 that the storage has not been completed via the computer interface unit 211 in the MFP 100.

After receiving a notification from the MFP 100 to indicate that the storage of charging information has been completed, in step S504, the PC/WS 103 checks the state of the charging information in the MFP 100, and if the storage of the charging information has been completed (YES in step S505), then in step S506, the PC/WS 103 ends the communication.

When receiving the notification from the MFP 100 to indicate that the storage of the charging information is uncompleted (YES in step S507), the PC/WS 103, in step S501, transmits charging information to the MFP 100 again. If there is no reply from the MFP 100 for more than a predetermined period of time, the PC/WS 103 executes a predetermined error process in step S508. The error processes include notifying the administrator of the error and compiling an error list. Besides these processes, an error process can be anything as long as it can notify that the storage of charging information is not complete.

Figure 8:
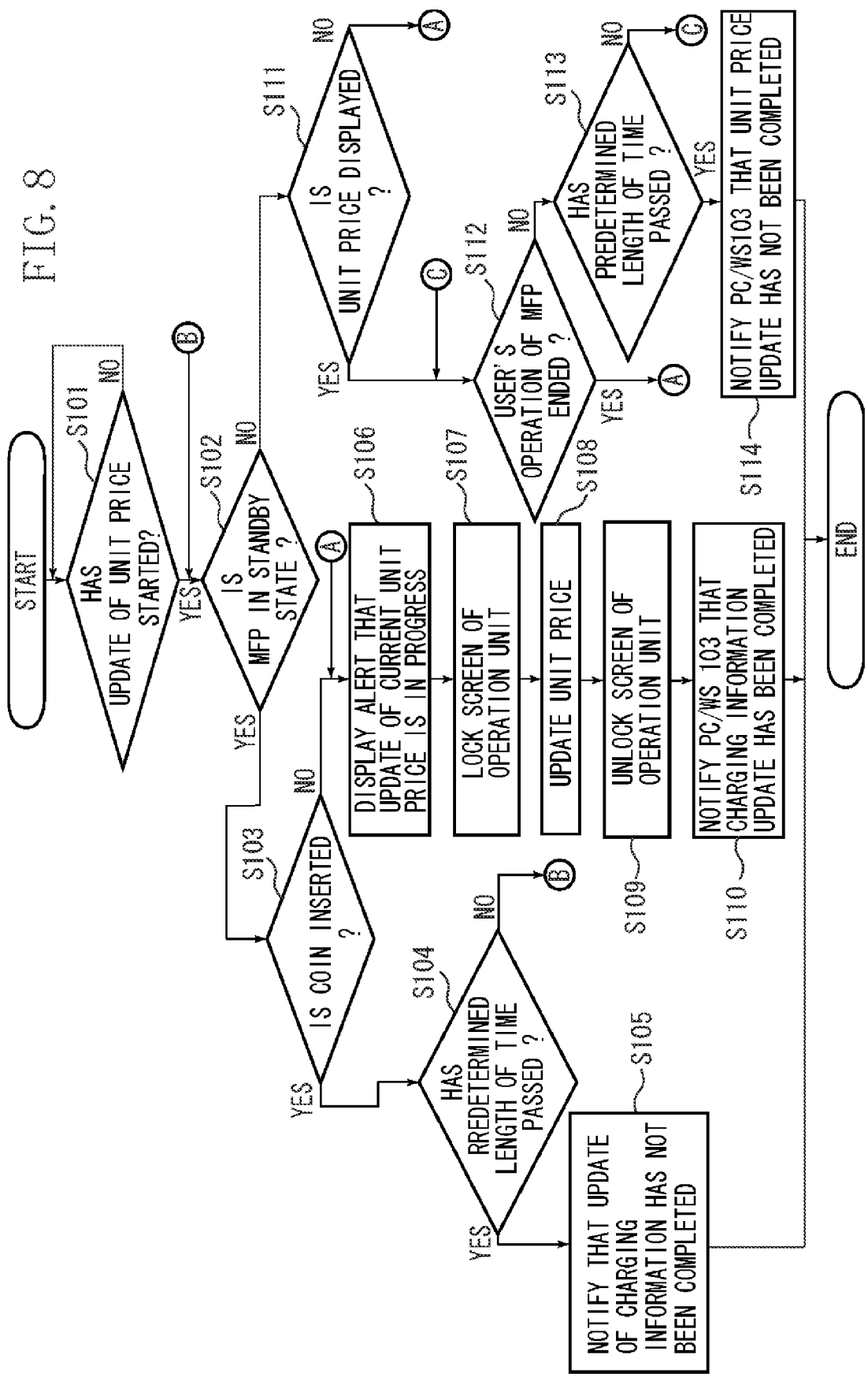
FIG. 8 is a flowchart illustrating an update operation of charging information according to the first exemplary embodiment of the present invention.

The procedure of updating the charging information stored in the storage unit of the MFP 100 based on the charging information received from the PC/WS 103 will now be described with reference to the flowchart in FIG. 8. The flowchart illustrated in FIG. 8 is executed by the CPU 201 in the MFP 100.

In step S101, the CPU 201 determines whether a date and time to start updating the unit prices included in the charging information stored in the nonvolatile memory 204 has arrived, and if the date and time to start updating the unit prices have not arrived (NO in step S101), no process is performed until the date and time to start updating the unit prices arrives. If the date and time to start updating the unit prices have arrived (YES in step S101), the processing proceeds to step S102.

In step 102, the CPU 201 determines whether the MFP 100 is in the standby state. The standby state here refers to a state that the MFP 100 has not operated longer than a predetermined period of time and is in a waiting state. The predetermined period of time can be set arbitrarily by the MFP 100. When the MFP 100 is in standby state (YES in step S102) the processing proceeds to step S103. If the MFP 100 is not in the standby state (NO in step S102) the processing proceeds to step S111. In step S103, the charging interface unit 209 acquires information as to whether there is money inserted into the charging unit 210. If there is money inserted (YES in step S103), the processing proceeds to step S104. If no money is inserted in the charging unit 210 (NO in step S103), while unit price update is permitted, the processing proceeds to step S106 and the charging information is updated.

In step S104, the charging interface unit 209 acquires information as to whether money has been held in the charging unit 210 longer than a predetermined length of time. The predetermined length of time can be determined arbitrarily. If money has been held longer than a predetermined length of time (YES in step S104), it is determined that update of the charging information should not be permitted, and the processing proceeds to step S105. If money has not been held longer than a fixed period of time (NO in step S104), the processing returns to step S102, and it is determined again whether update of the charging information is permitted. In step S105, the computer interface unit 211 notifies the PC/WS 103 that the update of the charging information has not been completed.

Steps S106 to S110 will now be described. In step S106, the operation unit 208 displays on the liquid crystal display operation portion 305 that the update of current unit prices is being performed.

In step S107, the operation unit 208 locks the screen on the liquid crystal display operation portion 305 to prohibit the user from operating the screen on the liquid crystal display operation portion 305 while the charging information is being updated. In step S108, the CPU 201 updates the unit prices in the charging information according to the charging information table received from the PC/WS 103.

In step S109, the operation unit 208 releases the lock on the screen of the liquid crystal display operation portion 305 to bring the screen back to the state that allows the user to perform an ordinary operation. In step S110, the computer interface unit 211 notifies the PC/WS 103 that the update of charging information has been completed.

Steps S111 to S114 will now be described. Those steps are used to determine whether the update of charging information can be performed according to the operating condition of the MFP 100 when the MFP 100 is not in the standby state.

In step S111, the operation unit 208 determines whether current unit prices are displayed on the liquid crystal display operation portion 305. When the unit prices are displayed thereon, it is written in unit price setting confirmation information managed in the MFP 100 that the unit prices have been confirmed. If the unit prices are displayed thereon (YES in step S111), the processing proceeds to step S112 to perform a next determination. If the unit prices are not displayed thereon (NO in step S111), the processing proceeds to step S106 to update the charging information by using the method described above.

In step S112, the CPU 201 determines whether the operation by the user has ended. It is determined that the operation by the user has ended when the User's intention to end copying is shown by pressing the Coin Return button on the charging unit 210 or by pressing the "End key" after copying by the printer unit is finished. If the operation by the user has ended (YES in step S112), the unit price setting confirmation information in which the unit prices have been written in step S111 is cleared, and the processing proceeds to step S106 to update the charging information by the method described above. If the operation by the user has not been completed (NO in step S112), the process proceeds to step S113.

In step S113, the CPU 201 determines whether a predetermined period of time has passed since the operation by the user has been performed. The predetermined period of time can be set arbitrarily. If the predetermined period of time has not passed (NO in step S113), the processing returns to step S112, and it is determined whether the operation by the user has ended again. If the predetermined period of time has passed (YES in step S113), it is determined that update of the charging information is not permitted, and the processing proceeds to step S114.

In step S114, the computer interface unit 211 notifies the PC/WS 103 that the update of the charging information has not been completed. Thus, the MFP 100 updates the charging information. Thereby, it is possible to control whether to update the charging information according to the operating condition of the MFP 100. Therefore, it is possible to prevent the unit prices from updating while the MFP 100 is operating, which the user may not expect.

In the flowchart in FIG. 8 described above, the process is switched depending on whether the MFP 100 is in the standby state, whether money is inserted, or whether the unit prices are displayed. In a second exemplary embodiment, whether to update the unit price setting can be determined according to whether the user has logged into the MFP 100. In the flowchart in FIG. 9, a case will be described where a determination is made whether the user has logged in the MFP 100 that has an authentication function.

In step S201, the CPU 201 determines whether the date and time to start updating the unit prices, which are written in the charging information table, has come or not. If the date and time to start updating the unit prices have not come (NO in step S201), the process is not performed until the date and time to start updating the unit prices come. In step S202, the CPU 201 determines whether the user has logged into the MFP 100. If the user has logged in (YES in step S202), the processing proceeds to step S203. If the user has not logged in (NO in step S202), the processing proceeds to step S204.

In step S203, the CPU 201 determines that the update of charging information is not permitted if the user has logged into the MFP 100, and the computer interface unit 211 notifies the PC/WS 103 that the update of charging information has not been completed. In steps S204 to S208, if the user has not logged in the MFP 100 (NO in step S202), the update of charging information is permitted, and the charging information is updated. The operations in the update of charging information in steps S204 to S208 are similar to those in steps S106 to S110 in FIG. 8. Therefore, their descriptions are not repeated here.

As described above, the MFP 100 with the authentication function cannot be operated unless the user has logged in. Therefore, whether to permit updating the charging information can be determined based on whether the user has logged in or not.

Figure 9:
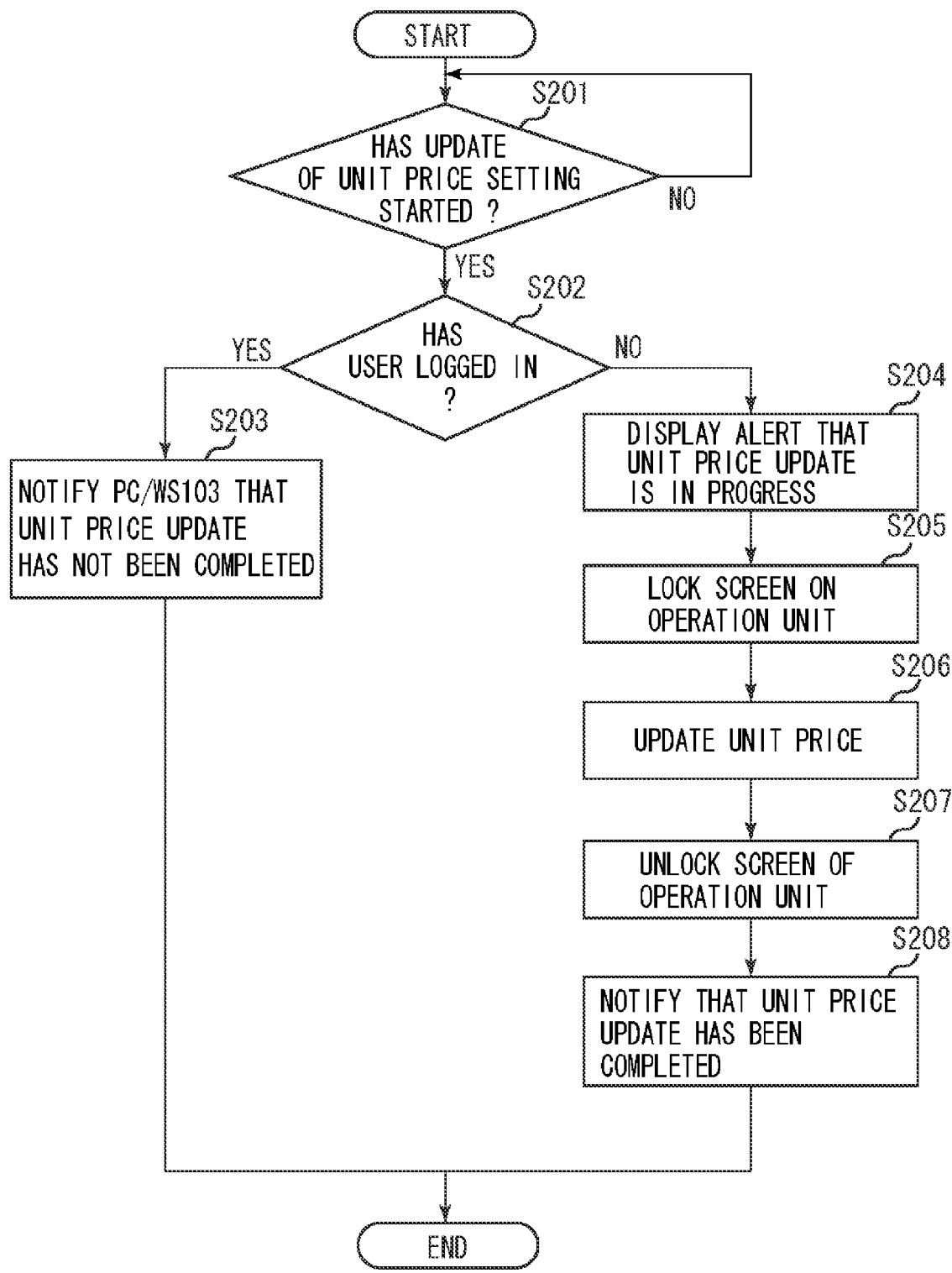
FIG. 9 is a flowchart illustrating an update operation of charging information according to a second exemplary embodiment of the present invention.
Figure 10:
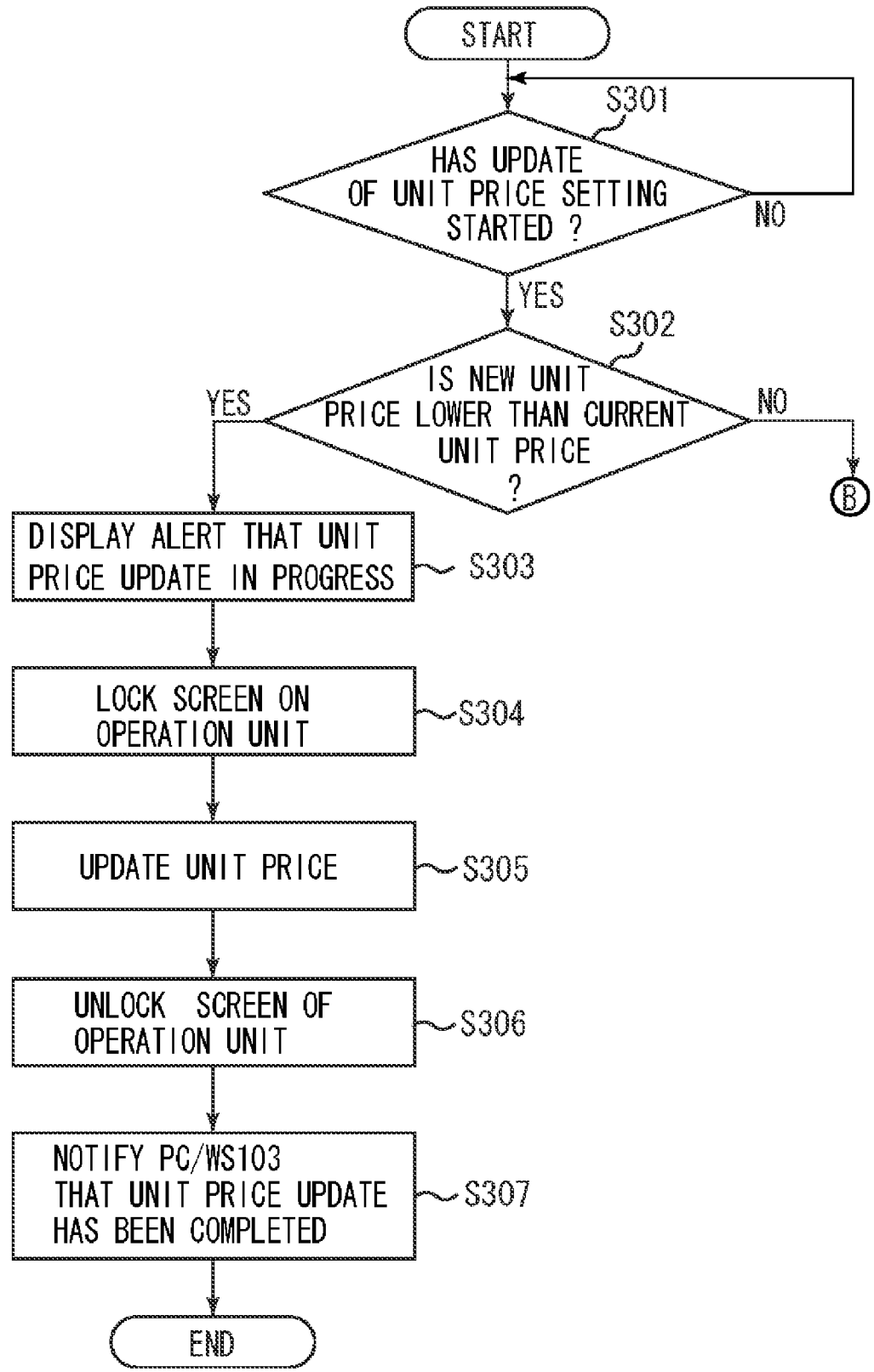
FIG. 10 is a flowchart illustrating an update operation of charging information according to a third exemplary embodiment of the present invention.

In FIGS. 8 and 9, cases have been discussed where charging information is not updated while the user is operating the MFP 100. Referring now to the flowchart in FIG. 10, a case where charging information can be updated even while the user is operating the MFP 100 when the unit prices in updated charging information are lower than the unit prices in the currently stored charging information.

In step S301, the CPU 201 determines whether the date and time to start updating the unit prices written in the charging information has come. If the date and time to start updating the unit prices have not come (NO in step S301), no process is performed until the date and time to start updating the unit prices have come.

In step S302, the CPU 201 compares the currently held charging information with the charging information for update stored in the nonvolatile memory 204. When the unit price indicated by the charging information after updating is lower than the unit price indicated by the currently held charging information, (YES in step S302), the process proceeds to step S303 to update the charging information regardless of the operating state of the MFP 100. When a new unit price is higher than the current unit price (NO in step S302), the processing proceeds to step S102, illustrated by the flowchart in FIG. 8, to determine the operating state of the MFP 100, and the CPU 201 updates the charging information based on a determination of the operating condition of the MFP 100.

In step S303, the operation unit 208 displays on the liquid crystal display operation portion 305 that the charging information is being currently updated. In step S304, the operation unit 208 locks the screen of the liquid crystal display operation portion 305 to prohibit the user from operating the screen while the charging information is being updated.

In step S305, the CPU 201 updates the charging information based on the charging information table received from the PC/WS 103. In step 306, the operation unit 208 releases the lock on the screen of the liquid crystal display operation portion 305 to bring the screen back to the state that enables the user to perform an ordinary operation. In step S307, the computer interface unit 211 notifies the PC/WS 103 that the update of the charging information has been completed.

As described above, according to a third exemplary embodiment, the CPU 201 controls the MFP 100 so that the charging information is updated regardless of the operating condition of the MFP when the unit price in the updated charging information is lower than the unit price in the currently held charging information (YES in step S302). Thereby, when charging information is updated so that the unit prices are lowered, it is possible to provide better services for users by updating the charging information as soon as possible regardless of the operating condition of the MFP.

In the first to third exemplary embodiments, the methods have been described in which the charging information sent from the PC/WS 103 is held temporarily in the MFP 100 and the charging information is updated. In a fourth exemplary embodiment, a method will be described in which charging information is updated without holding the charging information in the MFP 100.

Figure 11:
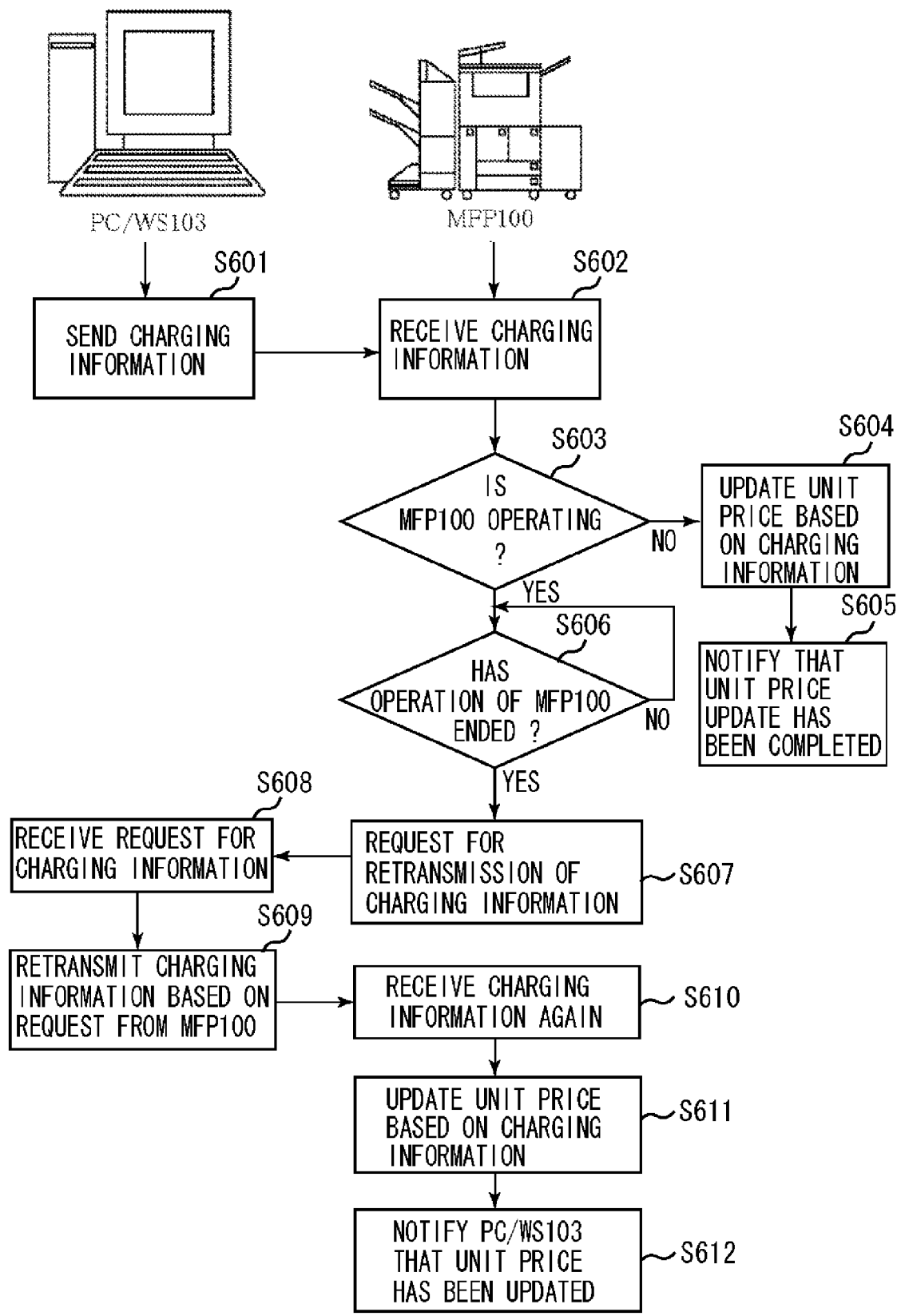
FIG. 11 is a flowchart illustrating exchanging of charging information according to a fourth exemplary embodiment of the present invention.

FIG. 11 is a flowchart illustrating an example of the exchanging of the charging information between the PC/WS 103 and the MFP 100 and timing of updating the charging information in the MFP 100.

In step S601, at arbitrary timing, the PC/WS 103 transmits charging information to the MFP 100. Since the received charging information is not held temporarily in the MFP 100, information such as the date and time to start updating the unit prices and the date and time to end updating the unit prices, which is added as attributes of the charging information in the first exemplary information, is not necessary in the present embodiment. At least information indicating new unit prices has to be included as necessary information for updating the charging information.

The MFP 100, which has received the charging information in step S602, determines by the CPU 201 whether the MFP 100 is operating in step S603. The criterion for determining whether the MFP 100 is in operation is similar to that in the process described in the first exemplary embodiment, and the description is not repeated here.

If the MFP 100 is not in operation and, therefore, update of charging information is permitted (NO in step S603), the charging information is updated in step S604, and the computer interface unit 211 notifies the PC/WS 103 that the update of the charging information has been completed in step S605. If the MFP 100 is in operation and the update of the charging information is not permitted (YES in step S603), the charging information is not updated. In this case, the MFP 100 discards the received charging information.

When the CPU 201 determines that the operation of the MFP 100 has ended (YES in step S606), the CPU 201 requests the PC/WS 103 to transmit charging information again in step S607. The operation unit 208 locks the screen of the liquid crystal display operation portion 305 to prohibit the user from operating the screen until the update of charging information is completed.

The PC/WS 103, on receiving from the MFP 100 a request to retransmit charging information in step S608, transmits charging information again in step S609. When receiving retransmitted charging information from the PC/WS 103 in step S610, the MFP 100 updates the charging information based on the received charging information in step S611. After the completion of the update of the charging information, the computer interface unit 211 notifies the PC/WS 103 that the update of the charging information has been completed in step S612.

Referring to the flowchart in FIG. 12, a process will be described in which the charging information is updated without storing new charging information in the MFP 100. In step S401, the MFP 100 receives charging information from the PC/WS 103. The MFP 100 does not store the charging information in the nonvolatile memory 204. In step S402, the CPU determines whether the MFP 100 is in operation. The criterion for determining whether the MFP 100 is in operation is similar to that described in the first exemplary embodiment, and the description is not repeated here. If the MFP 100 is operating (YES in step S402), the processing proceeds to step S403. If the MFP 100 is not operated (NO in step S402), the processing proceeds to step S411 to update the charging information.

In step S403, since the MFP 100 is operated, charging information cannot be updated, and therefore the received charging information is discarded. The processing proceeds to step S404. In step S404, the CPU 201 detects if the operation of the MFP 100 has ended. If a detection result indicates that the operation by the user has ended and the charging information can be updated (YES in step S404), the processing proceeds to step S405 to update the charging information. If the operation has not ended (NO in step S404), the processing proceeds to step S409.

In step S405, it has become possible to update the charging information, and the operation unit 208 locks the screen on the liquid crystal display operation portion 305 to prohibit the user from operating the screen while the charging information is updated. In step S406, the operation unit 208 displays on the liquid crystal display operation portion 305 to notify the user that the unit prices are being updated.

In step S407, the computer interface unit 211 requests the PC/WS 103 to retransmit new charging information transmitted a short time ago. In step 408, the computer interface unit 211 receives the charging information from the PC/WS 103 again, and the processing proceeds to step S413 to update the charging information.

If the operation of the MFP 100 has not ended (NO in step S404), in step S409, it is determined whether the operation time of the MFP 100 has exceeded a predetermined period of time. If longer than a predetermined period of time has passed (YES in step S409), the user may have forgotten to operate the MFP 100 after inserting the money or may have forgotten to perform the confirmation step. Therefore, the processing proceeds to step S410. If more than a fixed length of time has not passed (NO in step S409), the processing returns to step S404, and it is determined whether the operation of the MFP 100 has ended.

In step S410, the computer interface unit 211 notifies the PC/WS 103 that the update of the charging information has not been completed. The operations in the update of charging information in steps S411 to S415 are similar to those in steps S106 to S110 in FIG. 10. Therefore, the descriptions are not repeated here.

As described above, in the present exemplary embodiment, when the user is operating the MFP 100, the charging information transmitted from the PC/WS 103 is updated without being stored in the MFP 100.

In the first to fourth exemplary embodiments, the process of updating the charging information including the unit prices of printing service using the copy function has been described. The above-described process can be applied to the charging information for other image processing. For example, the above-described methods can be applied to the update of the charging information for facsimile transmission and the charging information for a reading process using the scanner.

Various exemplary embodiments of the present invention have been described above. The present invention can take various forms of exemplary embodiment, such as a system, apparatus, method, program, and computer-readable storage medium (recording medium). More specifically, the present invention can be applied to a system including a plurality of devices, and can be applied to a device constituted by a single unit.

According to an exemplary embodiment of the present invention, a software program that implements the functions of the exemplary embodiment described above (a program corresponding to the illustrated flowchart in the embodiment) can be supplied directly or remotely from an external device to a system or apparatus. The functions of an exemplary embodiment of the present invention can be implemented by executing the supplied program code read by the computer of the system or the apparatus.

Therefore, since the functions of an exemplary embodiment of the present invention are implemented by a computer, the program code itself, installed in the computer, also implements the present invention. In other words, the present invention covers a computer program itself, configured to implement the functions of the embodiment of the present invention.

In this case, so long as the functions of the program are included, the software program can be in any form, such as object code, a program executable by the interpreter, or script data supplied to the OS.

Recording media that can be used to supply the program include, for example, a floppy disk, hard disk, optical disk, magneto-optic memory card, ROM, and DVD (digital versatile disc (DVD-ROM, DVD-R)).

The method for supplying the program includes accessing a website on the Internet using the browsing function of a client computer, when the website allows each user to download the computer program according to the exemplary embodiments of the present invention, or compressed files of the programs having automatic installing functions, to a hard disk or other storage medium of the user. Furthermore, the program code constituting the programs according to the exemplary embodiments of the present invention can be divided into a plurality of files so that respective files are downloadable from different websites. Namely, the present invention encompasses World Wide Web (WWW) servers and File Transfer Protocol (FTP) servers that allow numerous users to download the program files so that their computers can realize the functions and processes according to the exemplary embodiments of the present invention.

The programs according to the exemplary embodiments of the present invention can be enciphered and the enciphered programs can be stored on a CD-ROM or a comparable recording medium when the programs of the present invention are distributed to the users. Any authorized users (i.e., users satisfying predetermined conditions) are allowed to download key information from a website on the Internet. The users can decipher the programs with the obtained key information and can install the programs on their computers.

Thus, the above-mentioned functions of the exemplary embodiments are implemented by executing the program on the computer. Furthermore, according to instructions of the program, the OS running on the computer performs all or part of the processes, thus implementing the functions of the embodiments.

Additionally, the program code read out of a computer-readable storage medium can be written into a memory of a function expansion board equipped in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-117295 filed Apr. 28, 2008, which is hereby incorporated by reference herein in its entirety.

What is claimed is:

1. An image processing apparatus that charges a user for executing a predetermined image process, the image processing apparatus including a processor and a memory, the apparatus comprising:

the memory having a holding unit configured to hold charging information;

the memory having a charging unit configured to charge a fee for a service of executing the predetermined image process based on the charging information held in the holding unit;

the memory having an update unit configured to update the charging information held in the holding unit;

the memory having a control unit configured to control the update unit not to update the charging information in a case where a user action for execution of the predetermined image process is acknowledged, and to control the update unit to update the charging information in a case where the user action for execution of the predetermined image process is not acknowledged; and a display unit configured to display the charging information before the update, wherein before the charging information before the update are displayed by the display unit, the control unit is configured to control the charging unit to update the charging information held by the holding unit, and after the charging information before the update have been displayed by the display unit, the control unit is configured to control not to update the charging information held by the holding unit.

2. The image processing apparatus according to claim 1, further comprising:

a printing unit configured to print an image on a recording medium, wherein the charging information includes unit prices for each predetermined unit.

3. The image processing apparatus according to claim 1, further comprising:

a notification unit configured to notify a result of update of the charging information.

4. The image processing apparatus according to claim 1, wherein the holding unit holds time information indicating time to update the charging information by the update unit as being associated with the charging information, wherein the update unit updates the associated charging information when the time has arrived.

5. The image processing apparatus according to claim 1, further comprising:

a receiving unit configured to receive money from the user, wherein before the receiving unit receives money from the user, the control unit is configured to control the charging unit to update the charging information held by the holding unit, and after the receiving unit has received money from the user, the control unit is configured to control not to update the charging information held by the holding unit.

6. The image processing apparatus according to claim 1, further comprising:

an authentication unit configured to authenticate the user to be allowed to log in, wherein before the authentication unit allows the user to log in, the control unit is configured to control the charging unit not to update the charging information held by the holding unit, and after the user has logged in, the control unit is configured to control the charging unit to update the charging information held by the holding unit.

7. The image processing apparatus according to claim 1, further comprising:

a comparison unit configured to compare the charge indicated by the charging information held in the holding unit and the charge indicated by the charging information to be held by the holding unit when the charging information is updated, wherein based on a result of comparison by the comparison unit, if the charges, which are indicated by the charging information to be held by the holding unit when the charging information is updated, is lower than the charges indicated by the charging information held in the holding unit, the control unit is configured to control the update unit to update the charging information even if the update of the charging information is not permitted.

8. The image processing apparatus according to claim 1, further comprising:

an information receiving unit configured to receive new charging information from an external device connected via a network, wherein the update unit is configured to update the charging information held in the holding unit based on the new information received by the information receiving unit.

9. The image processing apparatus according to claim 8, further comprising:

a discarding unit configured to discard the charging information received by the information receiving unit when the update of the charging information is not permitted.

10. The image processing apparatus according to claim 9, further comprising:

a requesting unit configured to request the external device to retransmit the new charging information when the charging information held in the holding unit can be updated after the discarding unit has discarded the charging information received by the information receiving unit.

11. The image processing apparatus according to claim 1, wherein the user action includes a cash insertion into the charging unit.

12. The image processing apparatus according to claim 1, wherein an operation screen is displayed for acknowledging the user action.

13. The image processing apparatus according to claim 1, wherein the user action includes a login to the image processing apparatus by the user.

14. A method for controlling an image processing apparatus that charges a user for executing a predetermined image process, including a processor and a memory, the method comprising:

using the memory to hold holding charging information on a storage medium;

using the memory to charge charging the user for executing the predetermined image process based on the charging information held in a storage device;

using the memory to update updating the charging information held in the storage device;

using the memory to control the image processing apparatus not to update the charging information in a case where a user action for execution of the predetermined image process is acknowledged;

controlling the image processing apparatus to update the charging information in a case where the user action for execution of the predetermined image process is not acknowledged; and displaying the charging information before the update, wherein before the charging information before the update are displayed, controlling the charging to update the charging information held, and after the charging information before the update have been displayed, controlling not to update the charging information held.

15. A non-transitory computer-readable storage medium storing a program configured to cause a computer to execute a method for controlling an image processing apparatus that charges a user for executing a predetermined image process, the method comprising:

holding charging information on a storage medium;

charging the user for executing the predetermined image process based on the charging information held in a storage device;

updating the charging information held in the storage device;

controlling the image processing apparatus not to update the charging information in a case where a user action for execution of the predetermined image process is acknowledged;

controlling the image processing apparatus to update the charging information in a case where the user action for execution of the predetermined image process is not acknowledged; and displaying the charging information before the update, wherein before the charging information before the update are displayed, controlling the charging to update the charging information held, and after the charging information before the update have been displayed, controlling not to update the charging information held.

16. An image processing apparatus that charges a user for executing a predetermined image process, the image processing apparatus including a processor and a memory, the apparatus comprising:

the memory having a holding unit configured to hold charging information received by an external apparatus;

the memory having a charging unit configured to charge a fee for a service of executing the predetermined image process based on the charging information held in the holding unit;

the memory having an update unit configured to update the charging information held in the holding unit;

the memory having a control unit configured to control the update unit to update the charging information in a case where the predetermined image process is not in execution, and to control the update unit not to update the charging information in a case where an event to update the charging information during execution of the predetermined image process; and a display unit configured to display the charging information before the update, wherein before the charging information before the update are displayed by the display unit, the control unit is configured to control the charging unit to update the charging information held by the holding unit, and after the charging information before the update have been displayed by the display unit, the control unit is configured to control not to update the charging information held by the holding unit.

* * * * *